United States Patent

[11] 3,597,970

| | | | | |
|---|---|---|---|---|
| [72] | Inventor | William R. Carter<br>5021 Wooddale Lane, Minneapolis, Minn. 55424 | 2,949,774 8/1960 Cox, Jr. | 73/194 |
| | | | 3,331,244 7/1967 Henderson | 73/194 |
| [21] | Appl. No. | 27,920 | Primary Examiner—Richard C. Queisser | |
| [22] | Filed | Apr. 13, 1970 | Assistant Examiner—John P Beauchamp | |
| [45] | Patented | Aug. 10, 1971 | Attorney—Schroeder, Siegfried & Ryan | |

[54] GRANULAR SOLIDS FLOWMETER
8 Claims, 3 Drawing Figs.

[52] U.S. Cl. .................................................. 73/194 M
[51] Int. Cl. .................................................. G01f 1/00
[50] Field of Search .................................... 73/194, 194 M, 231 M

[56] References Cited
UNITED STATES PATENTS
2,771,772 10/1956 Kirwan .......................... 73/194

ABSTRACT: A mass flow-measuring device for finely divided solids is provided which comprises a smooth cylinder rotating at a predetermined velocity on an axis transverse to the direction of flow of the falling solids. The change in required power to maintain the predetermined velocity when material is flowing over the power required when the cylinder is rotating freely provides the measure of flow.

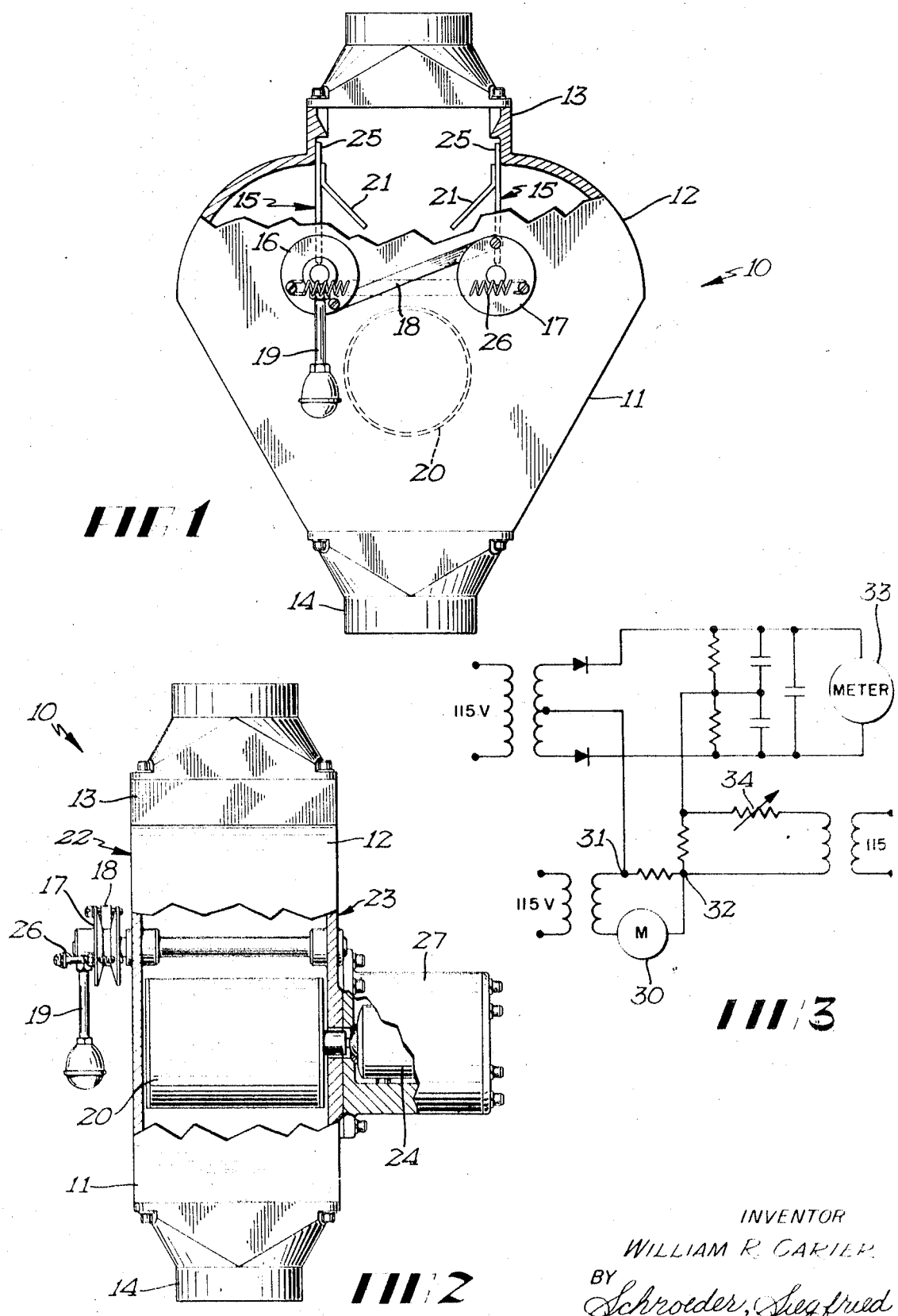

GRANULAR SOLIDS FLOWMETER

BRIEF SUMMARY OF THE INVENTION

The present invention is directed to a mass flowmeter useful in the determination of the rate of flow of granular-solid materials. While useful for the determination of the mass rate of flow of a variety of materials, it is expected to find its principal use in the determination of finely divided materials such as flour or for small grains. Such a flow-measuring device can be used in many ways. I expect that its principal use will be in the field of process control for continuous delivery systems such as flour grinding.

The invention relies upon the change in power required to rotatably drive a smooth closed cylinder at some predetermined velocity from the free and unloaded condition to a condition where the finely divided material is cascading over the cylinder. The cylinder is placed in the flowing stream of solids and is rotated on an axis which is perpendicular to the direction of flow. The flowing material strikes the rotating cylinder preferably on center, although it may also strike either the forward or trailing edge upper surface of the cylinder. The flowing material, in any event, creates a change in the amount of power required to drive the cylinder at its predetermined velocity.

Various types of prior art devices have utilized as a flow-measuring technique a measure of the change in the amount of power required to drive a rotating member in the free state and in a flowing stream of finely divided solids. However, all of those of which I am aware drive the rotating member with its axis of rotation parallel to the direction of flow. In the prior art devices referred to, the finely divided material lands on a more or less flat surface on the upper end of a disc and is accelerated off the edge by the centrifugal motion. The change in energy required to drive such devices is the mass-acceleration energy imparted to the solids being measured.

An important requirement in a mass flowmeter for solids is that the flowmeter be capable of handling foreign matter contained within a finely divided solid such as string, pieces of paper and the like without adverse effect. Further, the sensor portion of the overall flowmeter system should not tend to build up deposits of the solid material on its surface which will effect its overall sensitivity and accuracy. By the use of the smooth cylinder in the present invention, problems such as are common in the prior art devices are overcome.

BRIEF DESCRIPTION OF THE DRAWINGS

FIG. 1 is a front elevational view of a transducer housing and transducer assembly in accordance with the invention, with a portion broken away to shown the interior flow-directing means.

FIG. 2 is a side elevational view of FIG. 1 with a section partially broken away.

FIG. 3 is a circuit useful in providing a readout of the transducer in accordance with the present invention.

DETAILED DESCRIPTION

Referring to FIG. 1, there is shown in a front-elevational view a transducer and its surrounding housing generally identified 10. The assembly consists of an outer housing member which forms a conduit through which the finely divided material passes. The housing member includes wall members 11, which converge toward one another terminating in a neck portion 14, and an upper portion 12 which is shown as being curved in form and terminating in a narrow neck portion 13. The neck portion 13 is adapted to be connected to a general conduit (not shown) which serves as a source of supply of the solid material. Depending from the lower portion of the housing is a narrowed-neck portion 14, which is adapted to deliver the measured quantity of solid material to some desired point.

Shown partially in phantom and partially in the broken away portion are two identical vane members 15 and attached arms 21 which are rotatably connected to pinion members 16 and 17. Pinion members 16 and 17 are connected by bar member 18. Pinion 16 has a lever member 19 attached thereto which, in combination with bar member 18, acts to rotate vanes 15 from the position shown in the drawings to a position wherein the upper portions 25 of the vane members are drawn together to divert the incoming finely divided material around a cylindrical member 20. A spring 26 biases the vane members in the position shown.

Shown in phantom is cylinder member 20, which in the drawing is shown as being on axial alignment with the midpoint of the opening between the extension arms 21 of vane members 15. The cylinder member 20 may be a wide variety of materials, but I have found that an abrasion-resistant, cold-rolled steel of approximately 20 gauge thickness provides low mass readily formed into a cylinder capable of taking a highly polished finish. The size of the cylinder member 20 is not critical and will depend to some degree upon the nature of the use to which the flowmeter is put. If flow rate is to be high and/or of larger particle size, it is desirable that the cylinder be larger. For most purposes, a cylinder of about 4-inch diameter and an overall length of about 6 inches is appropriate.

As can be seen from the figure, finely divided material enters via neck portion 13 and is deflected by the arm portions 21 of vanes 15 to fall upon member 20. When lever member 19 is rotated in a clockwise motion, vane members 15 are turned toward one another until the upper edges 25 thereof contact and provide an umbrella effect over cylinder 20 and divert the falling stream of finely divided material around cylinder member 20.

In FIG. 2, like members are identified with similar numbers to those given with regard to FIG. 1. As is illustrated in FIG. 2, the rotating cylinder member 20 which forms a portion of the transducer of the present invention is smooth along its entire length and has closed ends and thus allows free flowing of the finely divided material around itself and is free of any means for entrapment of foreign objects such as string and pieces of paper. As the cylinder is smooth surfaced, there is no tendency to build up deposits on its surface. The housing member 10 in this view has generally parallel sides 22 and 23. Cylinder 20 is rotatably mounted through wall 23 to a constant speed motor schematically shown as 24. A housing generally identified 27 is provided to shield the motor from dirt and dust. The means for driving the cylinder member 20 at a constant velocity is most advantageously an induction motor, although other means may be employed. As the environment where my invention will find its use is commonly one of explosive hazard, it is desirable to eliminate brushes and other sparking arrangement where possible. A suitable motor for a 4-inch diameter cylinder used in measuring flowing flour is one which has a rotation velocity of about 1,725 r.p.m. operating off of a 115-volt, 60-cycle source.

The principle of operation of my invention is now believed readily understood. As a zero-point determination, the motor is actuated to drive cylinder member 20 at a constant speed such as the 1,725 r.p.m. noted above. The power required to drive the motor with this free running cylinder member is either measured or this power is given a value equivalent to a null value. The determination of the free-running power requirement either can be made with no finely divided material running through the housing 10, or it can be made with vane members 15 diverting the material around cylinder 20. It is also possible to check the calibration point during continuous operation by turning the vane members 15 to a position to intercept and deflect around the cylinder member 20 all of the finely divided material. In making a measurement of the rate of mass flow, the vane members 15 are placed in the position as shown in FIG. 1 and the finely divided material is directed into engagement with the upper surface of cylinder member 20. As shown in FIG. 1, the finely divided material will strike cylinder 20 equally on both sides of the vertical center line therethrough. The change in the power requirement to maintain the cylinder at 1,725 r.p.m. is then registered either on a meter or on a chart recorder while at the same time samples are collected from the lower conduit 14 for a given period of time. An empirical determination can then be made as to the amount of power required for various flow rates by measuring the amount of material delivered per unit time for various changing power requirements. Having once made such a calibration, it is only necessary to verify from time to time that the null point of the freely rotating cylinder and motor has not significantly changed. This can readily be accomplished by changing the position of the vane members 15 to give a new null point for the freely running motor and drum. Within reasonable limits of flow, a calibration at two different flow rates will suffice as the change in power requirements versus flow rate is substantially linear.

Measurement of the change in power required to drive cylinder 20 from a free-running condition to one where the solid material is flowing onto the cylinder will be determined by the type of driving means employed. For an induction motor as described above, a circuit in accordance with FIG. 3 has proved useful. The principal portion of the circuit is described in an article appearing in "Electrinics" magazine for July, 1939 at page 17.

In the figure an induction motor 30 supplied either at a live voltage of 115 volts or at some other suitable voltage has its power supply circuit connected to terminals 31 and 32 of a circuit generally in accordance with the aforementioned article in "Electronics." A meter 33 provides a measure of the current flowing through motor 30 at the predetermined voltage and thus measures power.

As a means of nulling or zeroing meter 33, one may use a variable resistor 34 connected as shown to adjust meter 33 to a zero reading when motor 30 is running under no load conditions. The meter may, of course, have in parallel thereto or as a substitute therefor a chart recorder for recording the power as a function of time to give an indication of the flow that has occurred. Also, if desired, a totalizing means may be included to give a reading of the total flow that has taken place during some time interval.

I claim:
1. A mass flowmeter for granular solids comprising:
   a. a substantially smooth surface closed-ended cylinder mounted to rotate on a generally horizontal axis;
   b. power driven means for rotating said cylinder at a predetermined velocity;
   c. means for directing a flowing stream of granular solids onto the upper surface of said cylinder;
   d. means for measuring the change in power required to rotate said cylinder at said predetermined velocity for the freely rotating condition to the condition where granular solids are flowing onto its upper surface.

2. A flowmeter in accordance with claim 1 wherein the cylinder is steel.

3. A flowmeter in accordance with claim 1 wherein said power-driven means is an electric induction motor.

4. A mass flowmeter for measuring the quantity of a granular solid flowing through a conduit comprising:
   a. a chamber adapted to form a portion of a finely divided solids-delivering conduit;
   b. a smooth-surfaced cylinder member rotatably mounted within a substantially vertically oriented portion of said chamber, said cylinder having its axis of rotation substantially perpendicular to the longitudinal axis of said vertically oriented portion;
   c. means for directing a stream of finely divided solid in a substantially downward vertical direction and into engagement with the upper surface of said cylinder;
   d. power driven means for rotating said cylinder member at a predetermined velocity;
   e. measuring means for determining the change in power required to drive said cylinder at said predetermined velocity when the finely divided material is flowing over the cylinder member and when the cylinder member is freely rotating.

5. A flowmeter in accordance with claim 4 wherein the means for directing the stream of finely divided material includes a vane member pivotally mounted within said casing to alternatively direct said stream onto and around said cylinder.

6. A flowmeter in accordance with claim 4 wherein said power-driven means is an electric motor.

7. A flowmeter in accordance with claim 6 wherein said electric motor is an induction motor.

8. A flowmeter in accordance with claim 4 wherein said chamber includes a first pair of substantially parallel wall members with the intervening wall members defining a generally converging funnel-shaped conduit and said cylinder member has its axis of rotation perpendicular to said parallel walls.